US006991415B1

(12) United States Patent  (10) Patent No.: US 6,991,415 B1
Anschultz  (45) Date of Patent: Jan. 31, 2006

(54) GRAVITY GRAIN DIVERTER

(76) Inventor: Jackie R. Anschultz, P.O. Box 29, Fisher, AR (US) 74249

( * ) Notice: Subject to any disclaimer, the term of this patent is extended or adjusted under 35 U.S.C. 154(b) by 724 days.

(21) Appl. No.: 09/949,156

(22) Filed: Sep. 7, 2001

(51) Int. Cl.
*B66G 65/28* (2006.01)

(52) U.S. Cl. .................................. 414/299; 414/294.11

(58) Field of Classification Search ................ 414/294, 414/301, 304, 323, 299, 295
See application file for complete search history.

(56) References Cited

U.S. PATENT DOCUMENTS

| 796,784 | A | | 8/1905 | Witherbee | |
|---|---|---|---|---|---|
| 2,965,250 | A | | 12/1960 | Johansson | 214/36 |
| 3,563,476 | A | * | 2/1971 | Donelson, Jr. | 239/668 |
| 3,796,419 | A | * | 3/1974 | Werner et al. | 414/170 |
| 3,868,028 | A | | 2/1975 | Mausser | 214/17 |
| 4,136,790 | A | * | 1/1979 | Berzins | 414/204 |
| 4,201,315 | A | * | 5/1980 | Chuss et al. | 222/66 |
| 4,270,671 | A | * | 6/1981 | Arnold | 222/58 |
| 4,307,987 | A | * | 12/1981 | Legille et al. | 414/205 |
| 4,342,532 | A | | 8/1982 | Voegele | 414/299 |
| 4,365,730 | A | * | 12/1982 | Ezban | 222/547 |
| 4,611,965 | A | | 9/1986 | Dixon et al. | 414/299 |
| 4,902,185 | A | | 2/1990 | Dixon et al. | 414/301 |
| 5,286,155 | A | * | 2/1994 | Straub | 414/139.4 |
| 5,372,467 | A | | 12/1994 | Harris | 414/301 |
| 5,435,689 | A | * | 7/1995 | Stonehouse | 414/502 |

* cited by examiner

*Primary Examiner*—Eileen D. Lillis
*Assistant Examiner*—Charles A. Fox
(74) *Attorney, Agent, or Firm*—Walker, McKenzie & Walker, PC

(57) ABSTRACT

A gravity grain diverter for use with a grain bin having an inlet opening for allowing grain to be introduced into the interior thereof. The gravity grain diverter includes a hopper for being positioned beneath the inlet opening of said grain bin. The hopper includes a tubular body member having an upper inlet opening for receiving grain loaded through the inlet opening of the grain bin and a lower outlet opening for discharging grain received in the upper inlet opening. The hopper means includes a lower outlet plate for closing the lower outlet opening of the tubular body member. Springs or the like are provided for urging the lower outlet plate toward the lower outlet opening of the tubular body member.

5 Claims, 4 Drawing Sheets

GRAVITY GRAIN DIVERTER

BACKGROUND OF THE INVENTION

1. Field of the Invention

The present invention relates to a gravity feed grain diverter used in conjunction with a grain bin to evenly distribute grain within the grain bin.

2. Description of the Prior Art

Heretofore, various means have been developed for use in distributing grain and the like within grain bins. A preliminary patentability search conducted in class 414, subclasses 299, 205, 206, 160, 199 and 204 produced the following patents which appear to be relevant to the present invention: Harris, U.S. Pat. No. 5,372,467, issued Dec. 13, 1994; Dixon et al., U.S. Pat. No. 4,902,185, issued Feb. 20, 1990; Dixon et al., U.S. Pat. No. 4,611,965, issued Sep. 16, 1986; Voegele, U.S. Pat. No. 4,342,532, issued Aug. 3, 1982; Mausser, U.S. Pat. No. 3,868,028, issued Feb. 25, 1975; and Johansson, U.S. Pat. No. 2,965,250, issued Dec. 20, 1960.

Nothing in the known prior art discloses or suggests the present invention. More specifically, nothing in the known prior art discloses or suggests a grain diverter including a hopper means having a tubular body member for being positioned within the inlet opening of a grain bin to receiving grain being loaded into the grain bin, and an outlet plate positioned over the outlet opening of the tubular body member; and including urging means for urging the outlet plate toward the outlet opening of the tubular body member.

SUMMARY OF THE INVENTION

The present invention is directed toward improving grain diverters for evenly distributing grain within a grain bin. The concept of the present invention is to position a tubular body member of a hopper means beneath the inlet opening in the roof structure of a grain bin for initially receiving grain being introduced into the interior of the grain bin through the inlet opening; positioning an outlet plate beneath the outlet opening of the tubular body member; and providing urging means to urge the outlet plate toward the outlet opening of the tubular body member.

DETAILED DESCRIPTION OF THE INVENTION

Figure 1:
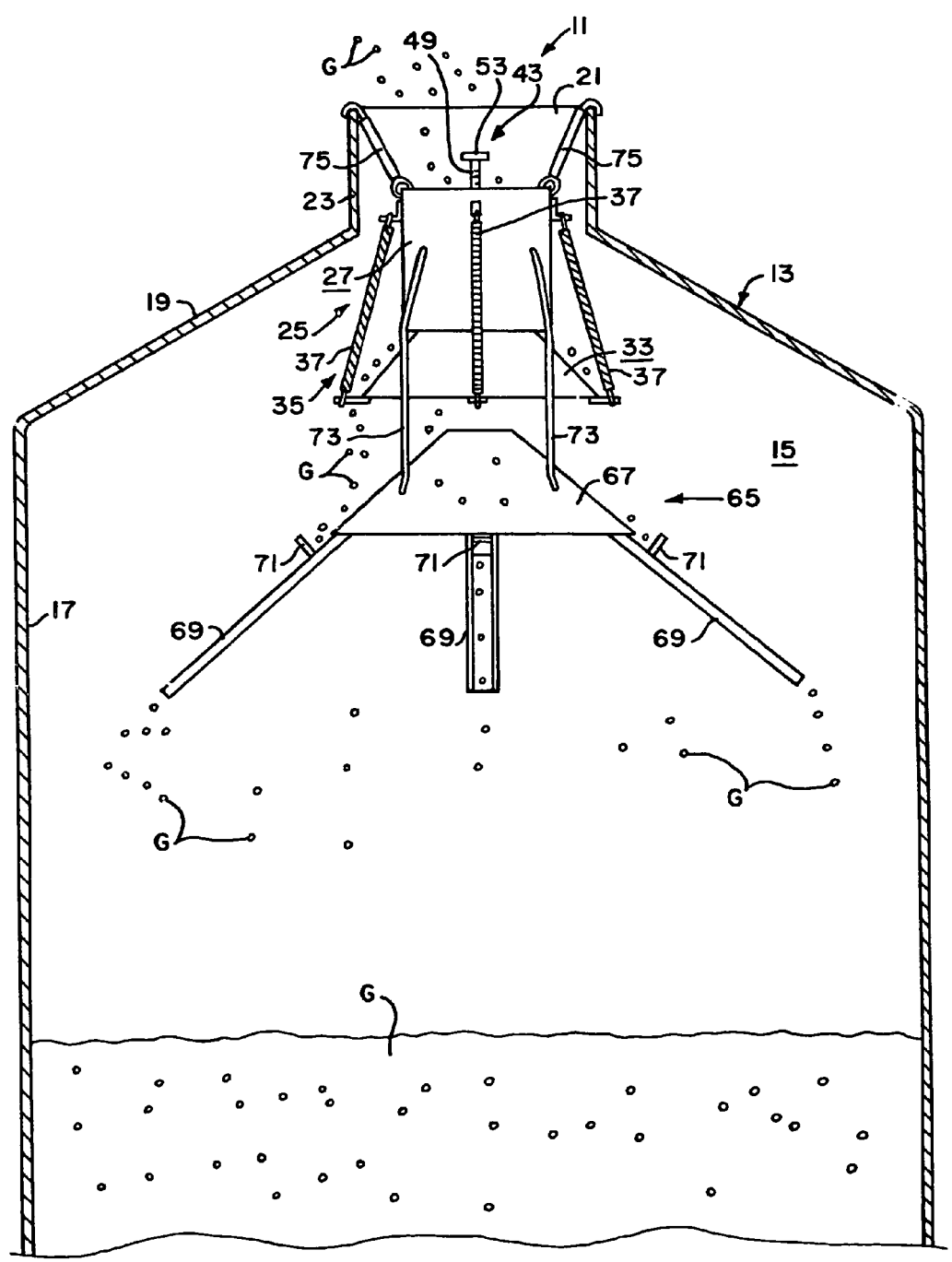
FIG. 1 is a somewhat diagrammatic side elevational view of the gravity grain diverter of the present invention, shown mounted within a grain bin, portions of the grain bin being broken away for clarity.

The gravity grain diverter 11 of the present invention is for use with a grain bin 13 for allowing grain G to be introduced into the interior 15 of the grain bin 13. The grain bin 13 may be of any typical construction having wall structure 17 and a roof structure 19 to define the interior 15. Thus, for example, the grain bin 13 may be constructed of metal with the wall structure 17 having a substantially cylindrical shape and with the roof structure 19 having a substantially conical shape covering the upper end of the cylindrical wall structure 17. The roof structure 19 is provided with a central inlet opening 21 for allowing grain to be introduced into the interior 15 of the grain bin 13 therethrough. A cylindrical collar 23 may be provided about the inlet opening 21. A lid or the like (not shown) may be used to close the inlet opening 21 in the typical manner when desired.

The grain diverter 11 includes hopper means 25 for being positioned beneath the inlet opening 21 in the roof structure 19 of the grain bin 13 as clearly shown in FIG. 1 for initially receiving grain G being introduced into the interior 15 of the grain bin 13 through the inlet opening 21.

Figure 2:
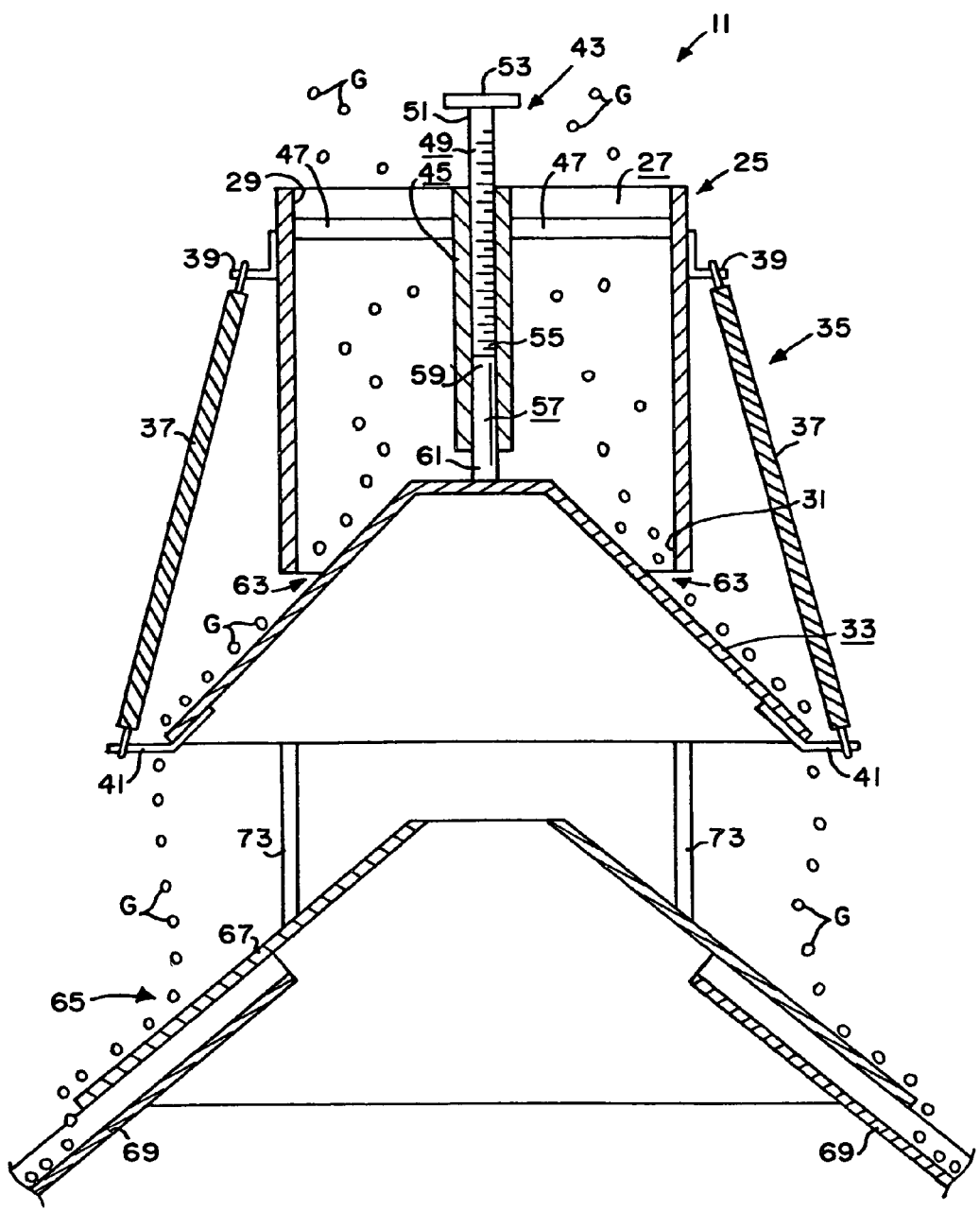
FIG. 2 is sectional view of the gravity grain diverter of the present invention with portions thereof omitted or broken away for clarity.
Figure 3:
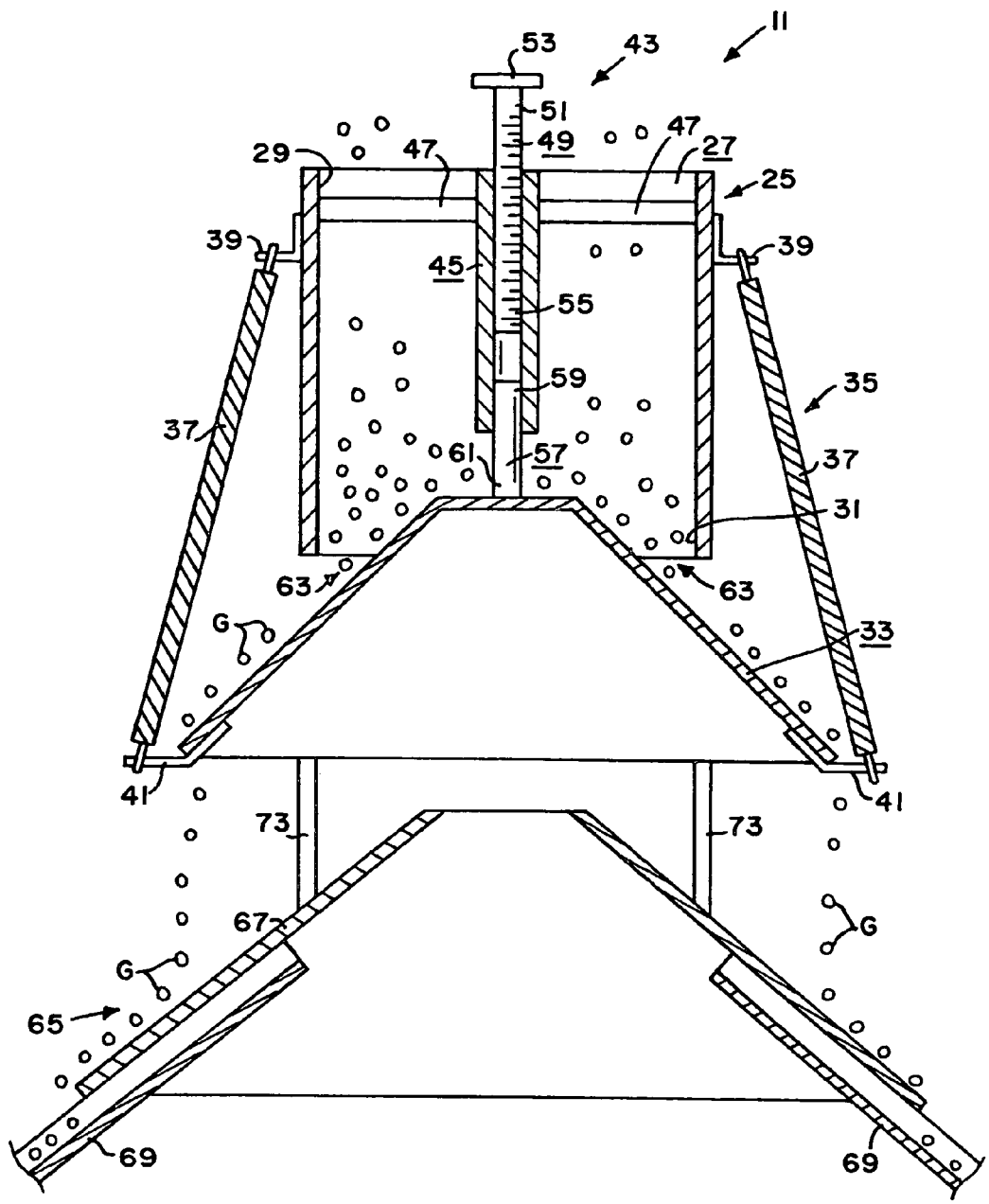
FIG. 3 is a sectional view substantially similar to FIG. 2 but with portions thereof in a moved position.
Figure 4:
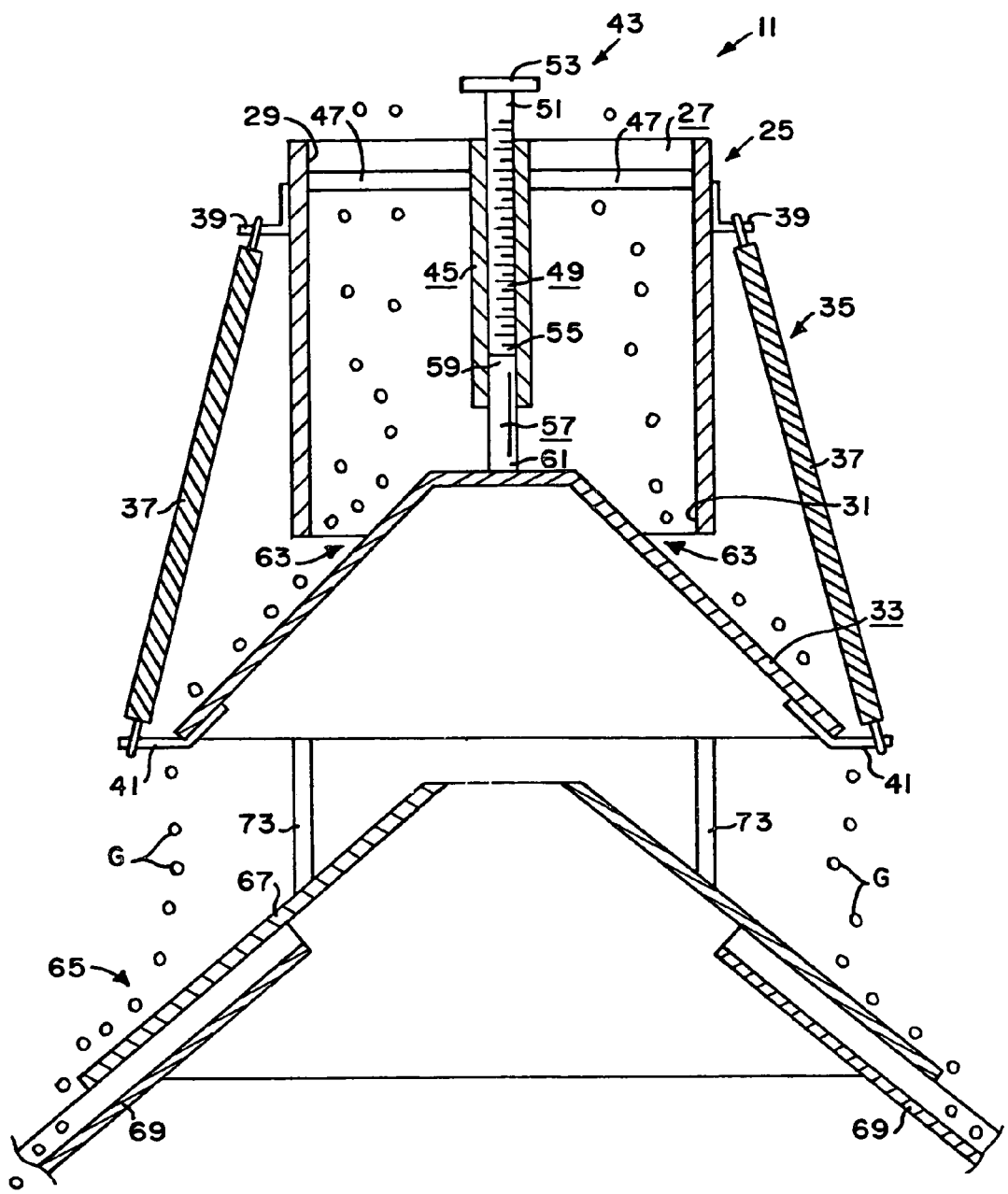
FIG. 4 is a sectional view substantially similar to FIGS. 2 and 3 but with portions thereof in a moved position.

The hopper means 25 includes a tubular body member 27 having an upper or inlet opening 29 and a lower or outlet opening 31 (see, in general, FIGS. 2–4). The body member 27 may be constructed of any substantially rigid material in any manner apparent to those skilled in the art. Thus, for example, the body member 27 may be formed out of a substantially rigid sheet metal or the like.

The hopper means 25 also includes a lower or outlet plate 33 for closing any desired portion of the lower or outlet opening 31 of the body member 27. The lower or outlet plate 33 controls how much and how fast grain G flows through the body member 27. At least the outer edge of the upper surface of the outlet plate 33 is preferably conical shaped as clearly shown in FIGS. 2–4, for directing grain G falling through the outlet opening 31 of the body member 27 outwardly and downwardly, evenly all around the outer edge of the outlet plate 33. The outlet plate 33 may be constructed of any substantially rigid material in any manner apparent to those skilled in the art. Thus, for example, the outlet plate 33 may be formed out of a substantially rigid sheet metal or the like in a generally truncated cone shape.

The grain diverter 11 includes urging means 35 for urging the outlet plate 33 toward the outlet opening 31 of the body member 27. The urging means 35 may include a plurality of spring members 37 extending between the body member 27 and the outlet plate 33 to normally pull the outlet plate 33 toward the outlet opening 31 of the body member 27. Thus, the urging means 35 may include four elongated coil spring members 37 with each spring member 37 substantially evenly spaced from each adjacent spring member 37 and with the upper end of each spring member 37 attached, via a bracket or lug 39, etc., to the body member 27 adjacent the upper end thereof, and with the lower end of each spring member 37 attached, via a bracket or lug 41, etc., to the outlet plate 33 adjacent the outer or lower end thereof. (Note: for clarity, only 2 or 3 spring members 37 are shown in the drawings.) The lugs 39, 41 may be metal structural members bolted, riveted, welded or otherwise fixedly attached to the respective body member 27 and outlet plate 33.

The grain diverter 11 preferably includes control means 43 for controlling the minimum spacing between the outlet opening 31 of the body member 27 and the outlet plate 33 to thereby control the flow of grain G through the hopper means 25. The control means 43 preferably includes a hollow sleeve 45, a number (preferably four) of cross braces 47 for securing mounting the hollow sleeve 45 within the body member 27 with the longitudinal axis of the sleeve 45 aligned and coinciding with the longitudinal axis of the body member 27 and with the hollow sleeve 45 extending from a point adjacent the inlet opening 29 to a point substantially midway between the inlet opening 29 and the outlet opening 31 as clearly shown in FIGS. 2–4. The control means 43 also preferably includes an elongated rod 49 having a first or upper end 51 with a T-handle 53 or the like attached thereto for allowing manual rotation thereof, and a second or lower end 55 with external threads thereof for screwably mating with internal threads within at least the upper end of the hollow sleeve 45 so that the user of the diverter 11 can manually rotate the rod 49 to vary the position of the lower end 55 of the rod 49 with respect to the sleeve 45 and, therefore, the body member 27 as will now be apparent to those skilled in the art. The control means 43 also preferably includes an elongated pin 57 having a first or upper end 59 sized to slidably fit within the lower end of the sleeve 45 and a second or lower end 61 for being fixedly attached to the top center of the outlet plate 33. Such an arrangement insures that the outlet plate 33 remains centered relative to the outlet opening 31 of the body member 27, while the lower end 55 of the rod 49 acts as a movable stop for the upper end 59 of the pin 57, and thus the outlet plate 33, so that a minimum space or gap 63 of, for example, 1 inch (2.54 centimeters) can be set between the outlet opening 31 of the body member 27 and the outlet plate 33. That is, even though the spring members 37 urge the outlet plate 33 against the outlet opening 31 to completely close the outlet opening 31 and prevent the passage of grain G therethrough, by adjusting the rod 49 via the T-handle 53 or the like so that the upper end 59 of the pin 57 will contact the lower end 55 of the rod 49 before the outlet plate 33 engages the outlet opening 31, a certain minimum gap 63 is provided, as will now be apparent to those skilled in the art. In addition to the minimum gap 63, once the weight of the amount of grain G loaded into the inlet opening 29 of the body member 27 surpasses the strength of the spring members 37, the weight of the grain G within the body member 27 supported by the outlet plate 33 will force the outlet plate 33 down away from the outlet opening 31, thereby increasing the gap 63 by an amount proportional to the amount of grain G being loaded into the body member 27.

The grain diverter 11 preferably includes grain spreader or deflector means 65 for being positioned beneath the hopper means 25 and for receiving grain G from the hopper means 25 and directing that grain G evenly within the interior 15 of the grain bin 13. The deflector means 65 may include a cone member 67 positioned directly beneath the outlet plate 33 of the hopper means 25, and a plurality of elongated channel members or chutes 69 attached to the cone member 67 and extending outwardly and downwardly therefrom. The deflector means 65 may include 6, 8, 10, 12 or more individual chutes 69 with each chute 69 substantially evenly spaced from each other chute 69. (Note, for clarity, only 2 or 3 chutes 69 are shown in the drawings.) Diverter plates 71 may be provided on one or more of the chutes 69 to direct heavy grain into the center of the interior 15 of the grain bin 13. A plurality of rigid braces 73 preferably extend between the cone member 67 of the deflector means 65 and the body member 27 to fixedly attach the deflector means 65 to the hopper means 25. Four braces 73 are preferably used, with each brace 73 substantially spaced from each other brace 73. (Note: for clarity, only two braces 73 are shown in the drawings) The deflector means 65 may be constructed in various manners, with various specific components and designs well known to those skilled in the art. One such design is the deflector means 45 disclosed in Dixon et al., U.S. Pat. No. 4,902,185, issued Feb. 20, 1990, incorporated herein by reference. See, e.g., column 3, lines 26–68, and column 4, lines 1–15 of said U.S. Pat. No. 4,902,185. Another such design is the spreader device 20 disclosed in Voegele, U.S. Pat. No. 4,342,532, issued Aug. 3, 1982, incorporated herein by reference. See, e.g., column 1, lines 53–68 and column 2, lines 1–19 of said U.S. Pat. No. 4,342,532.

The grain diverter 11 preferably includes attachment means 75 for attaching the grain diverter 11 to the roof structure 19 of the grain bin 13 directly under the inlet opening 21 thereof. The attachment means 75 may consist simply of a plurality of elongated chains or the like extending from the body member 27 to the upper edge of the collar 23 about the inlet opening 21 of the grain bin 13, etc.

To use the gravity grain diverter 11, it is first positioned within the grain bin 13 using the attachment means 75, etc., with the inlet opening 29 of the body member 27 of the hopper means 25 positioned directly below or conterminous with the inlet opening 21 in the roof structure 19 of the grain bin 13. The minimum gap 63 between the outlet opening 31 and outlet plate 33 can be manually set by rotating the rod 49 with the T-handle 53 or the like depending on the quantity, speed and size or type of grain G to be loaded into the grain bin 13, etc. When grain G is introduced into the interior 15 of the grain bin 13 through the inlet opening 21 in the roof structure 19 thereof in any conventional manner, substantially all of the grain G will pass into the inlet opening 29 of the body member 27 of the hopper means 25. Gravity and the conical shape of the outlet plate 33 will then cause the grain G to flow out through the gap 63 between the outlet opening 31 and outlet plate 33. The grain G will initially flow out the set minimum gap 63. However, if grain G builds up sufficiently within the body member 27, the weight of that built-up grain G will overcome the strength of the spring members 37 and urge the outlet plate 33 downward, enlarging the gap 63 and allow more grain G to flow out therethrough. When the grain G flows out the gap 63, it will fall onto the deflector means 65 and be substantially evenly spread over the floor of the grain bin 13 as will now be apparent to those skilled in the art.

The size of the body member 27 and outlet plate 33, the strength of the spring members 37, and the conical shape of the upper surface of the outlet plate 33, the design of the deflector means 65, etc., may vary depending on the type and volume of grain G being introduced, the size of grain bin 13, etc. The grain diverter 11 can be designed to handle various types and volume of grain G, under varying conditions, etc.

Although the present invention has been described and illustrated with respect to a preferred embodiment and a preferred use therefor, it is not to be so limited since modifications and changes can be made therein which are within the full intended scope of the invention.

The invention claimed is:

1. A gravity grain diverter for use with a grain bin having an inlet opening for allowing grain to be introduced into the interior thereof, said gravity grain diverter comprising:

(a) hopper means for being positioned beneath said inlet opening of said grain bin; said hopper means including a tubular body member having an upper inlet opening for receiving grain loaded through said inlet opening of said grain bin and a lower outlet opening for discharging grain received in said upper inlet opening; said hopper means including a lower outlet plate for closing said lower outlet opening of said tubular body member;

(b) urging means for urging said lower outlet plate toward said lower outlet opening of said tubular body member; and (c) control means for maintaining a minimum gap between said lower outlet plate and said lower outlet opening of said tubular body member; said control means including:
   (i) a hollow sleeve attached to said tubular body member of said hopper means,
   (ii) an elongated rod adjustably attached to said hollow sleeve of said control means, and
   (iii) an elongated pin movably attached to said hollow sleeve of said control means and fixedly attached to said lower outlet plate of said hopper means so that adjustment of said elongated rod relative to said hollow sleeve of said control means will adjust said minimum gap between said lower outlet plate and said lower outlet opening of said tubular body member.

2. The gravity grain diverter of claim 1 in which said lower outlet plate of said hopper means has a conical upper surface.

3. The gravity grain diverter of claim 1 in which said urging means includes spring members between said tubular body member and said lower outlet plate of said hopper means for pulling said lower outlet plate toward said lower outlet opening of said tubular body member.

4. The gravity grain diverter of claim 1 in which said hollow sleeve of said control means has a first end and having a second end; in which said elongated rod of said control means has a first end and a second end; in which said elongated pin of said control means has a first end and a second end; in which said second end of said elongated rod of said control means is movably positioned within said first end of said hollow sleeve of said control means; in which said first end of said elongated pin of said control means is movably positioned within said second end of said hollow sleeve of said control means; and in which said first end of said elongated pin of said control means engages said second end of said elongated rod of said control means to set said minimum gap between said lower outlet plate and said lower outlet opening of said tubular body member.

5. The gravity grain diverter of claim 1 in which said hollow sleeve of said control means is threaded; and in which said elongated rod of said control means is threaded to coact with said threaded hollow sleeve of said control means and to allow said minimum gap between said lower outlet plate and said lower outlet opening of said tubular body member to be varied by rotating said elongated rod of said control means.

* * * * *